(12) United States Patent  
Mikhailov et al.

(10) Patent No.: US 8,857,631 B2
(45) Date of Patent: Oct. 14, 2014

(54) UNIVERSAL CONTAINER CARRIER

(75) Inventors: Serguei Mikhailov, Mississauga (CA); Robert Jakusik, Mississauga (CA); Reda Fayek, Guelph (CA); Marek Stopka, Mississauga (CA); Kieran Maguire, Adjala Tosorontio (CA)

(73) Assignee: Becton, Dickinson and Company, Franklin Lakes, NJ (US)

( * ) Notice: Subject to any disclaimer, the term of this patent is extended or adjusted under 35 U.S.C. 154(b) by 571 days.

(21) Appl. No.: 13/129,197

(22) PCT Filed: Nov. 16, 2009
(Under 37 CFR 1.47)

(86) PCT No.: PCT/CA2009/001642
§ 371 (c)(1),
(2), (4) Date: Nov. 10, 2011

(87) PCT Pub. No.: WO2010/054479
PCT Pub. Date: May 20, 2010

(65) Prior Publication Data
US 2013/0240468 A1    Sep. 19, 2013

Related U.S. Application Data

(60) Provisional application No. 61/114,998, filed on Nov. 14, 2008.

(51) Int. Cl.
*A47G 29/00* (2006.01)
*B01L 9/06* (2006.01)
*B60N 3/10* (2006.01)

(52) U.S. Cl.
CPC . *B01L 9/06* (2013.01); *B60N 3/106* (2013.01); *B01L 2200/023* (2013.01); *B01L 2200/025* (2013.01)

USPC .................................................. 211/71.01

(58) Field of Classification Search
CPC .............. B01L 9/00; B01L 9/04; B01L 9/06; B60N 3/102; B60N 3/103; B60N 3/106; G01N 35/10
USPC ............ 211/71.01, 74, 81, 85.18–85.23, 120, 211/124; 198/803.7, 803.8, 470.1; 248/313, 248/311.2

See application file for complete search history.

(56) References Cited

U.S. PATENT DOCUMENTS 305,621 A * 9/1884 McGovern ..................... 24/488
3,425,732 A * 2/1969 Reich ............................. 294/16

(Continued)

OTHER PUBLICATIONS

International Search Report, PCT/CA2009/001642, dated Apr. 27, 2010.

(Continued)

*Primary Examiner* — Korie H Chan
(74) *Attorney, Agent, or Firm* — Lerner, David, Littenberg, Krumholz & Mentlik, LLP

(57) ABSTRACT

A universal container carrier includes a base plate, and a pair of support frames coupled to the base plate. At least one of the support frames is configured to move relative to the other support frame. Each support frame comprises at least one container support configured to engage a portion of the side wall of a container disposed between the support frames The container carrier also includes a resilient biasing mechanism that is coupled to the base plate and the at least one support frame, and is configured to urge the at least one support frame towards the other support frame.

19 Claims, 6 Drawing Sheets

(56) References Cited

U.S. PATENT DOCUMENTS

| | | | |
|---|---|---|---|
| 3,871,832 A | | 3/1975 | Leblanc |
| 4,195,587 A | * | 4/1980 | Voss et al. ...................... 114/218 |
| 4,371,138 A | * | 2/1983 | Roberts .......................... 248/201 |
| 4,705,331 A | * | 11/1987 | Britton ........................... 439/387 |
| 4,716,811 A | * | 1/1988 | Johnson ........................ 89/40.12 |
| 4,733,842 A | * | 3/1988 | Wilkerson ................ 248/231.51 |
| 4,823,934 A | * | 4/1989 | Lemaire et al. ............ 198/470.1 |
| 4,880,956 A | * | 11/1989 | Mazoyer ...................... 219/60 A |
| 4,956,899 A | * | 9/1990 | Green ............................ 24/488 |
| 6,156,275 A | | 12/2000 | Dumitrescu et al. |
| 6,274,092 B1 | | 8/2001 | Itoh |
| 6,966,457 B1 | * | 11/2005 | Torbet ........................... 222/102 |
| 7,309,055 B1 | * | 12/2007 | Spiegel et al. .................... 251/6 |
| 2004/0267305 A1 | * | 12/2004 | Borgman ...................... 606/209 |
| 2005/0207945 A1 | | 9/2005 | Itoh |
| 2006/0284045 A1 | | 12/2006 | Conibear |

OTHER PUBLICATIONS

Totem Offisource™ Catalogue. (Totem Offisource, (CA>>Sep. 1, 2008. pp. 212-216, 357.

\* cited by examiner

UNIVERSAL CONTAINER CARRIER

CROSS-REFERENCE TO RELATED APPLICATIONS

This patent application is a national phase entry under 35 U.S.C. §371 of International Application No. PCT/CA2009/001642, filed Nov. 16, 2009, published in English, which claims the benefit of the filing date of U.S. Provisional Patent Application Ser. No. 61/114,998, entitled "Universal Container Carrier", filed Nov. 14, 2008, the contents of which are incorporated herein by reference.

FIELD

This patent application relates to an apparatus for holding a plurality of containers. In particular, this patent application relates to a container carrier for transporting a plurality of specimen containers.

BACKGROUND

Specimen containers are used in laboratory environments for storing and transporting specimens to be tested. Specimen containers come in a variety of sizes depending on the characteristics or the amount of a specimen needing to be stored or transported. Industry standards may also dictate the type of container to be used for transporting a particular specimen.

Testing specimens one at a time may be a time consuming and labor intensive process. Therefore, specimen testing may be automated. However, multiple sizes of specimen containers may be delivered to a laboratory for specimen testing, thereby frustrating the automated testing process.

Emmitt (U.S. Pat. No. 4,124,122) describes a rack or holder for test tubes comprising a base and at least one test tube support plate member spaced apart from the base substantially parallel thereto. Both the base and the support plate member are provided with corresponding vertically aligned apertures. A toroidal resilient member having internal diameter slightly less than the outside diameter of the test tubes is disposed in each aperture. A test tube is retained in the holder via the apertures of the base and plate, and held in place by friction from the resilient member.

Mawhirt (U.S. Pat. No. 4,861,553) describes an automatic sampling system including a test apparatus for testing fluid withdrawn from a closed test tube. Stoppered test tubes are continuously and automatically delivered to the test apparatus by a conveyor system that includes a continuous linkage of test tube holders.

Morrison (U.S. Pat. No. 5,632,338) describes a test tube rack assembly including a test tube rack pivotally connected to a base having an end support structure for allowing pivoting motion of the test tube rack.

Yamakawa (U.S. Pat. No. 6,255,614) describes a specimen-container transfer apparatus comprising a conveyor unit for transporting specimen-container racks, a specimen-container transfer mechanism for taking specimen containers out of a specimen-container rack and putting them in a specimen-container housing rack, and a control unit for controlling the order in which the specimen containers are put into the specimen-container housing racks.

SUMMARY

As described in this patent application, the container carrier comprises a base plate, and a pair of support frames coupled to the base plate. At least one of the support frames is configured to move relative to the other support frame. Each support frame comprises at least one container support configured to engage a portion of the side wall of a container disposed between the support frames The container carrier also includes a resilient biasing mechanism that is coupled to the base plate and the at least one support frame, and is configured to urge the at least one support frame towards the other support frame.

The support frames may each have an elongate axis that extends between the carrier end members. At least one of the container supports may comprise a rotatable support that is configured for rotation about the elongate axis. The rotatable support may comprise an elongate shaft, and a pair of conically-shaped roller members that are rotatable disposed on the elongate shaft. Each conical roller member may have a base portion and an apex portion, with the apex portions of the conical roller members being disposed proximate each other.

The support frames may be coupled to the base plate through a pivoting linkage that is coupled to a centre portion of the base plate. The resilient biasing mechanism may comprise a pair of wings that is hingedly coupled to opposite sides of the base plate, and biasing springs that are coupled to the base plate and the wings, configured such that the wings and the biasing springs urge the support frames towards each other.

The support frames may each have an elongate axis that extends between the support frame ends, and may be configured to move relative to the each other along an axis that is perpendicular to the elongate axis. The wings may be configured to move the support frames relative to the each other along an axis perpendicular to the elongate axis.

The support frames may each have a pair of opposite ends and an elongate axis that extends between the opposite ends. At least one of the container supports may comprise a pair of rotatable supports that are configured for rotation about a respective axis that is parallel to the elongate support frame axis. One of the rotatable supports may be disposed above the other rotatable support.

BRIEF DESCRIPTION OF THE DRAWINGS

The aforementioned features will now be described, by way of example, with reference to the accompanying drawings, in which.

DETAILED DESCRIPTION

Figure 1:
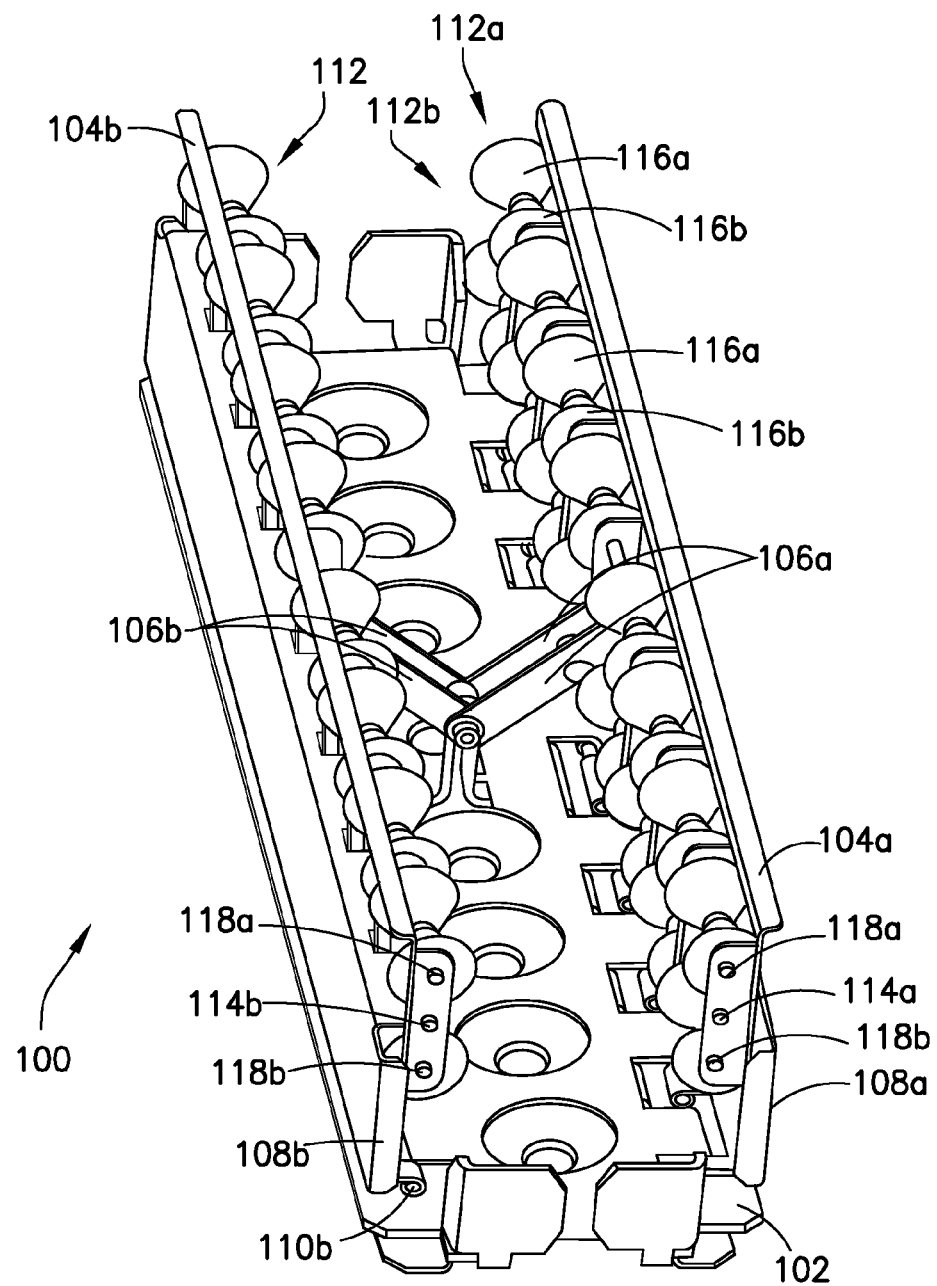
FIG. 1 is an upper perspective view of the universal container carrier.
Figure 2:
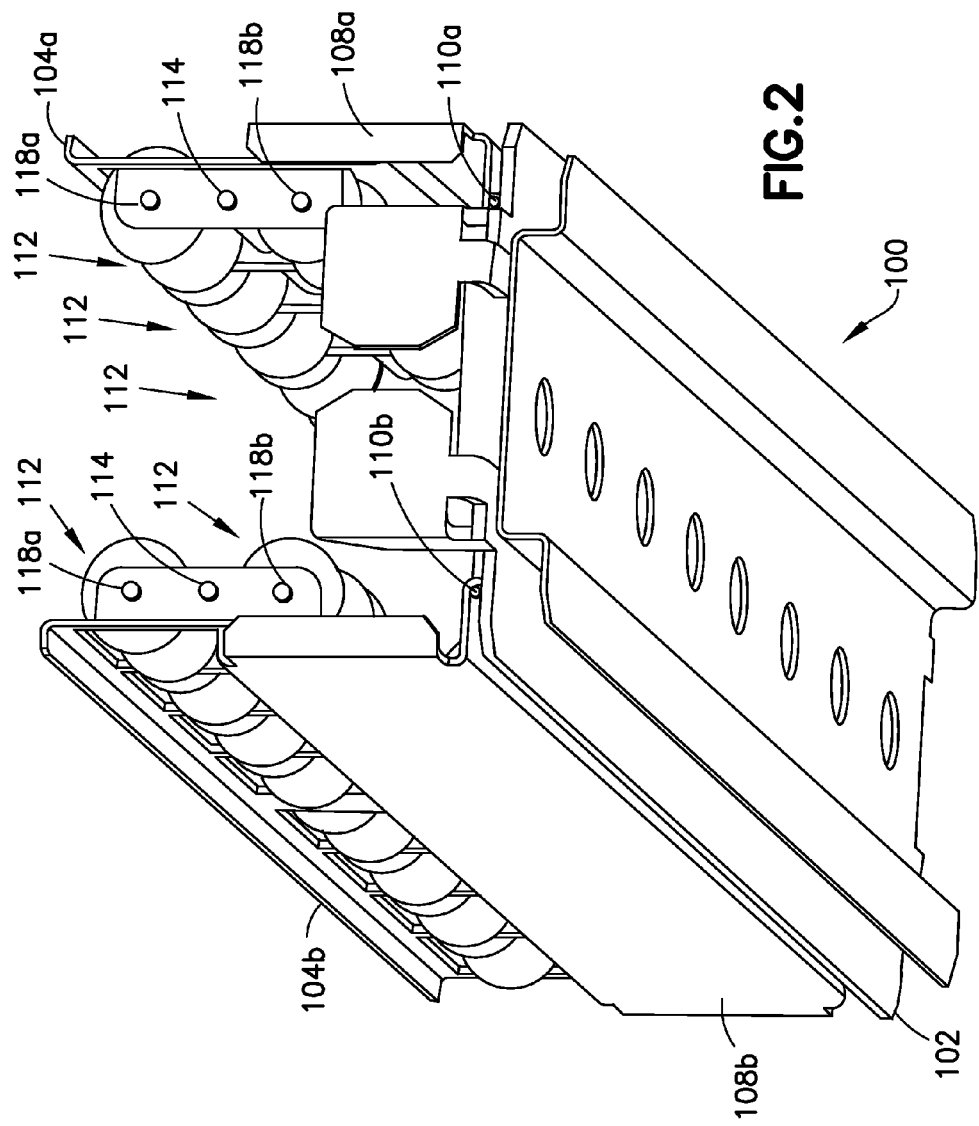
FIG. 2 is a bottom perspective view of the universal container carrier.
Figure 3:
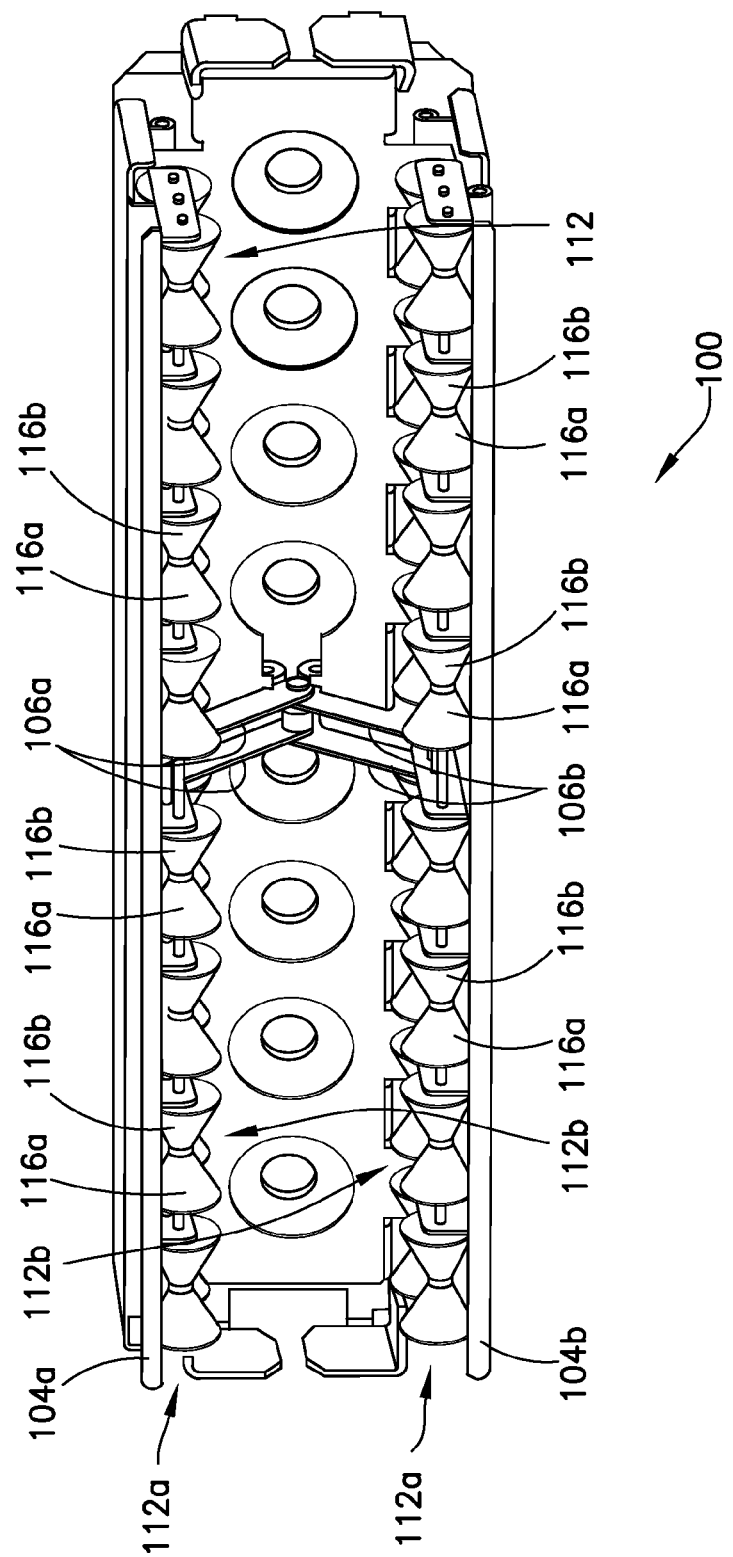
FIG. 3 is a top plan view of the universal container carrier.
Figure 4:
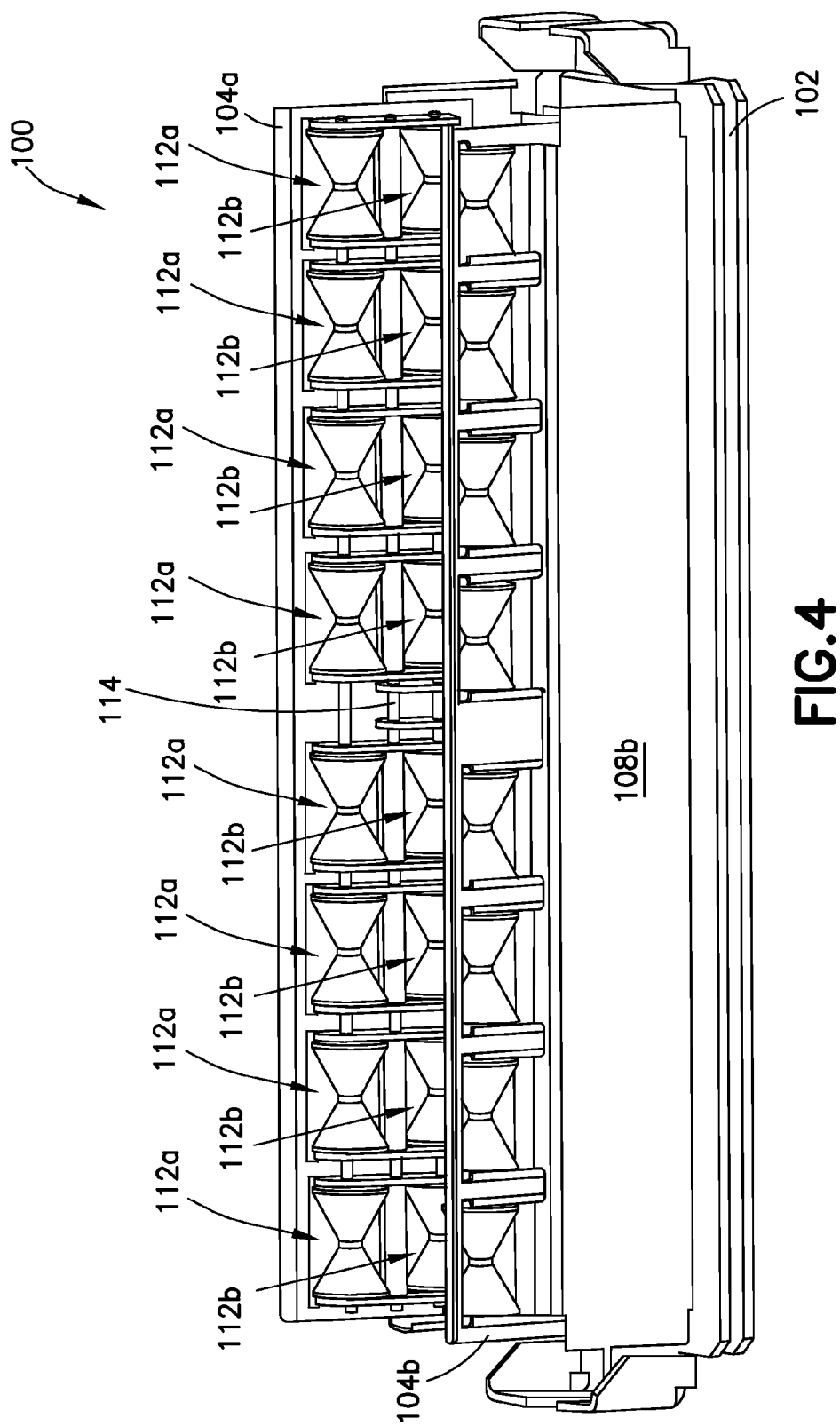
FIG. 4 is a side elevation of the universal container carrier.
Figure 5:
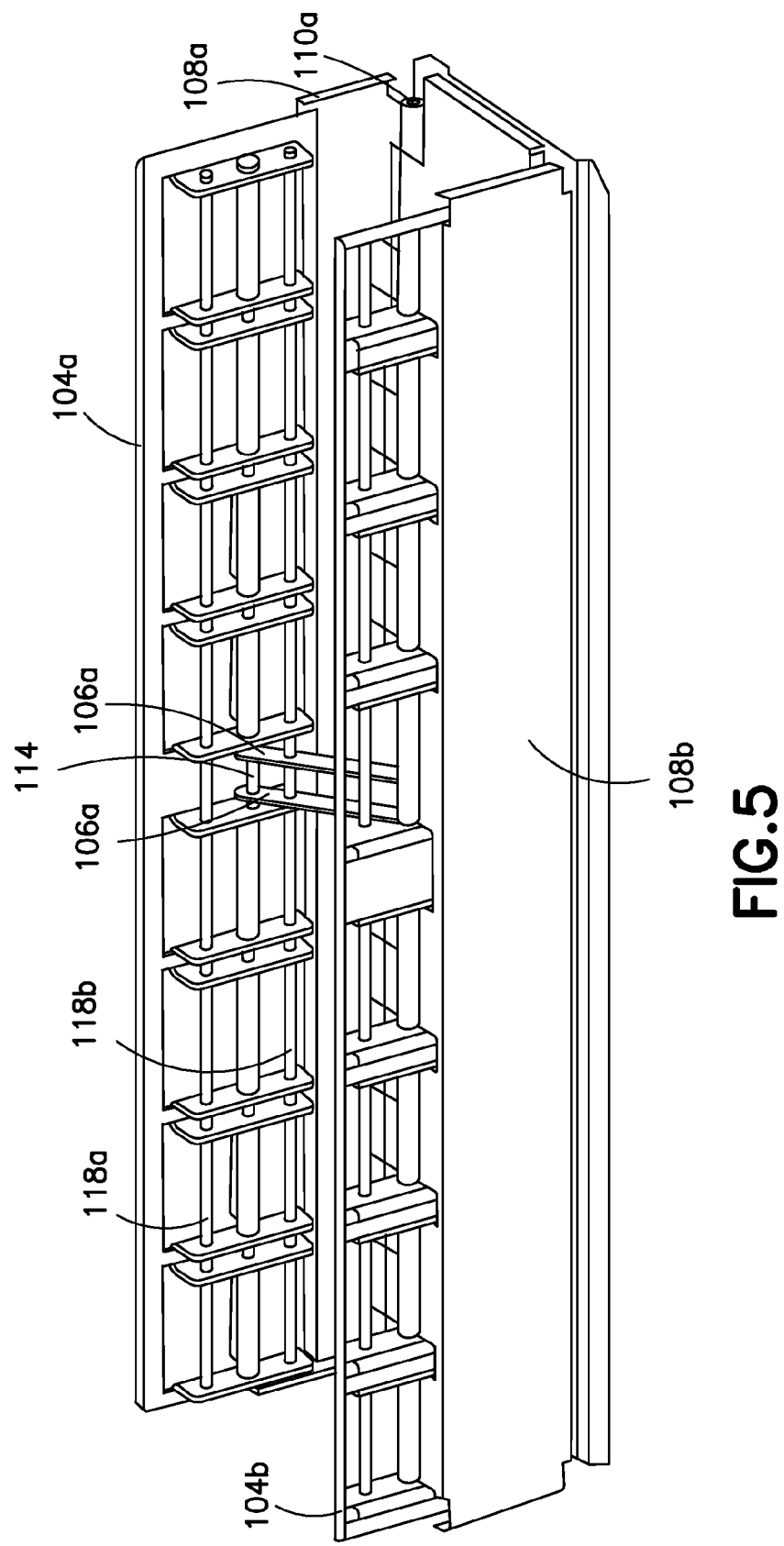
FIG. 5 is a side perspective view of the universal container carrier, with the container supports removed for clarity.
Figure 6:
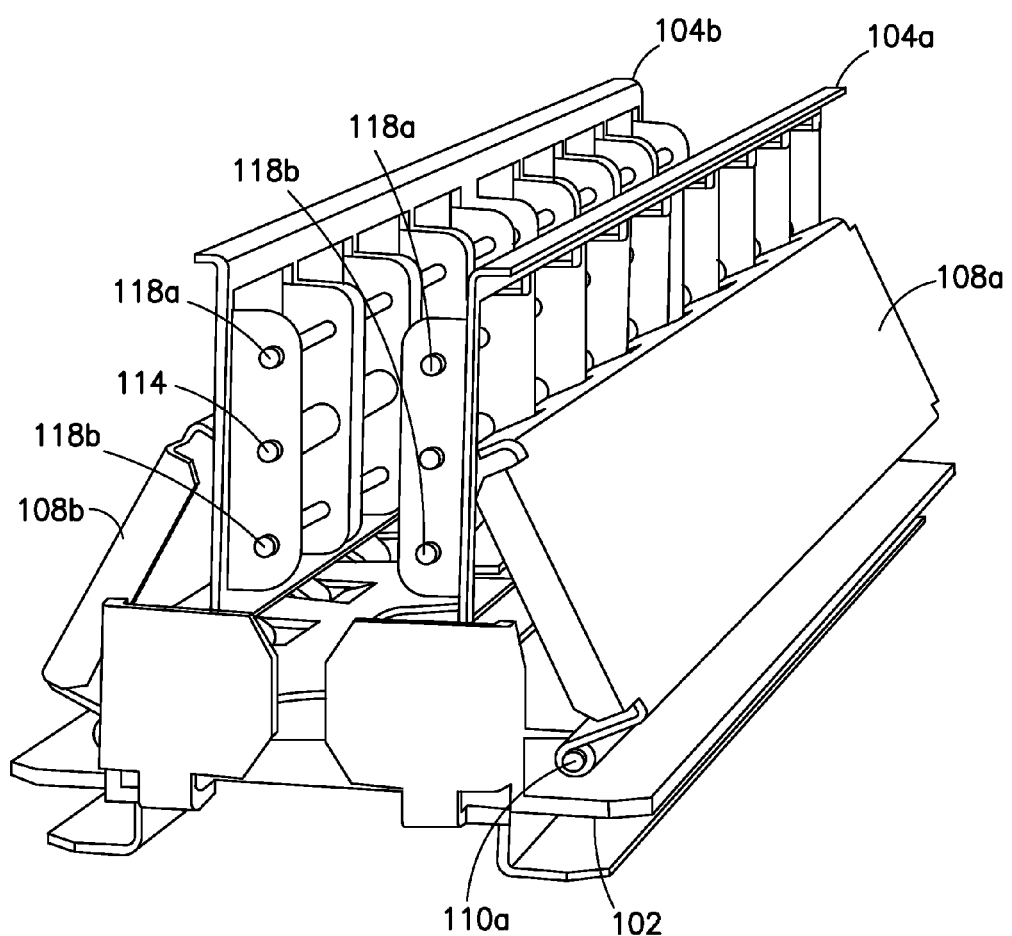
FIG. 6 is an end elevation of the universal container carrier, with the container supports removed for clarity.

The drawings depict a universal container carrier, denoted generally as 100, that comprises a base plate 102, and a pair of support frames 104 (denoted individually as 104a, 104b) that are coupled to the base plate 102. At least one of the support frames 104 is configured to move relative to the other support frame 104. The universal container carrier 100 also includes a resilient biasing mechanism that is coupled to the base plate 102 and the moveable support frame 104, and is configured to urge the movable support frame 104 towards the other support frame 104.

At least one of the support frames 104 may be coupled to the base plate 102 through one or more pivoting linkages. Preferably, both of the support frames 104 are movable relative to each other, and are coupled to the base plate 102 through pivoting linkages 106 (denoted individually as 106a, 106b) that are pivotally coupled to a centre portion of the base plate 102. As shown, the pivoting linkages 106 may be coupled to the respective support frames 104 via a respective elongate shaft 114 that extends along the length of each support frame 104. As will become apparent, with this configuration the vertical orientation of the support frames 104 self-adjusts to the shape of the containers that are disposed between the support frames 104. Alternately, the support frames 104 may be coupled to the base plate 102 through a pivoting linkage (not shown) that is pivotally coupled to the opposite ends of the base plate 102 and the support frames 104.

One of the support frames 104 may comprise a container support 112 that is configured to engage a portion of the side wall of a container that is disposed between the support frames 104. Preferably, the container support 112 presents the container with V-shaped support surface to retain the container within the container support 112. Further, typically the container has a substantially cylindrical shape. However, the container is not limited to any particular configuration, but can include, for example, prescription bottles, biological specimen containers and test tubes.

Preferably, each support frame 104 comprises one of the container supports 112, disposed such the container support 112 of the support frame 104a is disposed opposite the container support 112 of the support frame 104b. With this configuration, the container supports 112 are disposed to securely capture a container that is disposed between the support frames 104.

More preferably, as shown, each support frame 104 comprises a plurality of the container supports 112, configured such that each container support 112 of the support frame 104a is disposed opposite a respective container support 112 of the support frame 104b. With this configuration, the universal container carrier 100 is able to securely carry a plurality of the containers via the support frames 104 and the base plate 106. Further, as shown, the base plate 102 may include a plurality of apertures or recesses for engagement with a bottom portion of the containers.

To accommodate the plurality of container supports 112 within the support frame 104, preferably each support frame 104 has an elongated rectangular shape and an elongate axis. The elongate axis of the support frame 104a is oriented substantially parallel to the elongate axis of the support frame 104b. Further, the support frames 104 are configured to move relative to the each other along an axis that is perpendicular to the elongate axis.

To allow the containers to be easily inserted and removed from the universal container carrier 100, each container support 112 may be configured for rotation about an axis that is substantially parallel to the elongate axis of the respective support frame 104. Moreover, to increase the stability provided by the container support 112, each container support 112 may comprise a pair of rotatable supports 112a, 112b that are configured for rotation about a respective axis that is parallel to the elongate axis of the respective support frame 104. As shown, the rotatable support 112a is disposed above the rotatable support 112b.

In order to present the container with a V-shaped support surface, preferably the support frame 104 carries a pair of elongate shafts 118a, 118b that are disposed one above the other, and each rotatable support 112a, 112b comprises a pair of conically-shaped roller members (denoted individually as 116a, 116b) that are rotatably mounted on the respective elongate shaft 118. As shown, the elongate shaft 114 is disposed between the elongate shafts 118a 118b, and each elongate shaft 118 extends substantially parallel to the elongate axis of the respective support frame 104.

Each conical roller member 116 has a base portion and an apex portion, and the container support 112 is oriented such that the central axis of the conical roller members 116 coincides with the axis of the respective elongate shaft 118. The apex portion of the conical roller member 116a is disposed proximate the apex portion of the conical member 116b. Further the apex portions of the rotatable supports 112a, 112b of the support frame 104a are disposed opposite the apex portions of the respective rotatable supports 112a, 112b of the support frame 104b. Preferably, each conical roller member 116 is fabricated from a resilient material to accommodate minor differences in the diameters of the containers that are carried by the universal container carrier 100.

The resilient biasing mechanism may comprise a pair of pivoting wings 108 (denoted individually as 108a, 108b), and biasing springs (not shown). The pivoting wings 108 are hingedly coupled, at their respective bottom edges, to opposite sides of the base plate 102 via respective hinges 110a, 110b that extend in a direction that is substantially parallel to the elongate axis of the base plate 102. Preferably, the pivoting wings 108 are also pivotally coupled, at their respective upper (free) edges, to the support frames 104 along the elongate shaft 114 of the support frames 104. This configuration allows each support frame 104 to pivot about an axis that is substantially parallel to the elongate axis of the elongate shaft 114, and maintains each support frame 104 in a substantially vertical position as the support frames 104 move inwards towards the centre of the universal container carrier 100 and outwards from the centre of the universal container carrier 100.

The biasing springs are coupled to the base plate 102 and the pivoting wings 108 along the length of the hinges 110, and are configured to cause each pivoting wing 108 to rotate about its respective hinge 110, in an inwardly direction towards the centre of the universal container carrier 100. The inwards rotational movement of the wings 108 causes the upper (free) edges of the pivoting wings 108 to move laterally inwards towards each other. As a result, the support frames 104 are urged by the wings 108 to move towards each other along an axis that is perpendicular to the elongate axis of the base plate 102, thereby allowing a container to be captured between opposing container supports 112.

When the universal container carrier 100 is empty, the biasing springs urge the support frames 104 to move towards each other until the container supports 112 of the support frame 104a contact the container supports 112 of the support frame 104b. As a result, the empty space between pairs of opposing container supports 112 is at or near minimum. Containers are inserted into the universal container carrier 100 by directing each container downwards into the space between a pair of opposing container supports 112.

When the first container is inserted, the support frames 104 move laterally away from each other, via the pivoting linkages 106, as the container engages the roller members 116, until the container is fully inserted into the universal container carrier 100. Further lateral movement of the support frames 104 is prevented by the biasing springs and the pivoting wings 108. Also, the biasing springs and the pivoting wings 108 cause the support frames 104 to firmly press the container supports 112 against the sides of the container, thereby retaining the container within the universal container carrier 100.

Additional containers, having substantially the same diameter as the first container, may also be inserted into the universal container carrier 100.

The containers are removed from the universal container carrier 100 by pulling each container upwards from the respective container supports 112. When the last container is removed, the support frames 104 move laterally towards each other, via the pivoting linkages 106, under the biasing action of the biasing springs and the pivoting wings 108, until the container supports 112 of the support frame 104*a* contact the container supports 112 of the support frame 104*b*.

Since the universal container carrier 100 automatically self-adjusts to the size of the container, a laboratory need not purchase container carriers that are specifically sized to the size of the containers.

The invention claimed is:

1. A universal container carrier comprising:
   a base plate;
   a pair of support frames coupled to the base plate through a pivoting linkage that is pivotally coupled to a center portion of the base plate, at least one of the support frames being configured to move relative to the other support frame, each said support frame comprising at least one container support configured to engage a portion of the side wall of a container disposed between the support frames; and
   a resilient biasing mechanism coupled to the base plate and the at least one support frame and configured to urge the at least one support frame towards the other support frame.

2. The container carrier according to claim 1, wherein the support frames each have an elongate axis, at least one of the container supports comprises a rotatable support, the rotatable support being configured for rotation about the elongate axis.

3. The container carrier according to claim 2, wherein the rotatable support comprises an elongate shaft, and a pair of conically-shaped roller members rotatabley disposed on the elongate shaft.

4. The container carrier according to claim 3, wherein each conically-shaped roller member has a base portion and an apex portion, and the apex portions of the conical roller members are disposed proximate each other.

5. The container carrier according to claim 1, wherein the resilient biasing mechanism comprises a pair of wings hingedly coupled to opposite sides of the base plate, and biasing springs coupled to the base plate and the wings, the wings and the biasing springs urging the support frames towards each other.

6. The container carrier according to claim 5, wherein the support frames each have a pair of opposite ends and an elongate axis extending between the opposite ends, and the wings are configured to move the support frames relative to the each other along an axis perpendicular to the elongate axis.

7. The container carrier according to claim 1, wherein the support frames each have a pair of opposite ends and an elongate axis extending between the opposite ends, at least one of the container supports comprises a pair of rotatable supports, each rotatable support being configured for rotation about a respective axis parallel to the elongate axis.

8. The container carrier according to claim 7, wherein one of the rotatable supports is disposed above the other rotatable support.

9. The container carrier according to claim 2, wherein the resilient biasing mechanism comprises a pair of wings hingedly coupled to opposite sides of the base plate, and biasing springs coupled to the base plate and the wings, the wings and the biasing springs urging the support frames towards each other.

10. The container carrier according to claim 3, wherein the resilient biasing mechanism comprises a pair of wings hingedly coupled to opposite sides of the base plate, and biasing springs coupled to the base plate and the wings, the wings and the biasing springs urging the support frames towards each other.

11. The container carrier according to claim 4, wherein the resilient biasing mechanism comprises a pair of wings hingedly coupled to opposite sides of the base plate, and biasing springs coupled to the base plate and the wings, the wings and the biasing springs urging the support frames towards each other.

12. A universal container carrier comprising:
    a base plate;
    a pair of support frames coupled to the base plate, at least one of the support frames being configured to move relative to the other support frame, each said support frame comprising at least one container support configured to engage a portion of the side wall of a container disposed between the support frames; and
    a resilient biasing mechanism comprising a pair of wings hingedly coupled to opposite sides of the base plate, and biasing springs coupled to the base plate and the wings, the wings and the biasing springs urging the support frames towards each other.

13. The container carrier according to claim 12, wherein the support frames are coupled to the base plate through a pivoting linkage that is pivotally coupled to a center portion of the base plate.

14. The container carrier according to claim 12, wherein the support frames each have an elongate axis, at least one of the container supports comprises a rotatable support, the rotatable support being configured for rotation about the elongate axis.

15. The container carrier according to claim 14, wherein the rotatable support comprises an elongate shaft, and a pair of conically-shaped roller members rotatably disposed on the elongate shaft.

16. The container carrier according to claim 15, wherein each conical-shaped roller member has a base portion and an apex portion, and the apex portions of the conical roller members are disposed proximate each other.

17. The container carrier according to claim 12, wherein the support frames each have a pair of opposite ends and an elongate axis extending between the opposite ends, and the wings are configured to move the support frames relative to each other along an axis perpendicular to the elongate axis.

18. The container carrier according to claim 12, wherein the support frames each have a pair of opposite ends and an elongate axis extending between the opposite ends, at least one of the container supports comprises a pair of rotatable supports, each rotatable support being configured for rotation about a respective axis parallel to the elongate axis.

19. The container carrier according to claim 18, wherein one of the rotatable supports is disposed above the other rotatable support.

* * * * *